(12) United States Patent
Buchholz

(10) Patent No.: US 6,582,028 B2
(45) Date of Patent: Jun. 24, 2003

(54) METHOD FOR PRODUCING BRUSHES

(75) Inventor: Erwin Buchholz, Asbach (DE)

(73) Assignee: M+C Schiffer GmbH, Neustadt-Wied (DE)

( * ) Notice: Subject to any disclaimer, the term of this patent is extended or adjusted under 35 U.S.C. 154(b) by 0 days.

(21) Appl. No.: 09/997,846

(22) Filed: Nov. 30, 2001

(65) Prior Publication Data

US 2002/0056941 A1 May 16, 2002

Related U.S. Application Data

(63) Continuation of application No. PCT/EP99/03873, filed on Jun. 2, 1999.

(51) Int. Cl.$^7$ .............................................. A46D 3/00
(52) U.S. Cl. ................................... 300/21; 264/243
(58) Field of Search ............................ 300/21; 264/243

(56) References Cited

U.S. PATENT DOCUMENTS

| | | | | |
|---|---|---|---|---|
| 2,643,158 A | * | 6/1953 | Baldanza | 300/21 |
| 3,408,112 A | * | 10/1968 | Piotrowski | 300/21 |
| 4,609,228 A | * | 9/1986 | Bickel | 300/21 X |
| 4,637,660 A | * | 1/1987 | Weihrauch | 300/21 |
| 4,892,698 A | * | 1/1990 | Weihrauch | 263/243 |
| 4,979,782 A | * | 12/1990 | Weihrauch | 300/21 X |
| 5,045,267 A | * | 9/1991 | Weihrauch | 264/243 |
| 5,474,366 A | * | 12/1995 | Strutt et al. | 300/21 |
| 5,609,890 A | * | 3/1997 | Boucherie | 264/243 X |
| 5,622,411 A | * | 4/1997 | Weihrauch | 300/21 |
| 5,728,408 A | * | 3/1998 | Boucherie | 264/243 X |
| 5,823,633 A | * | 10/1998 | Weihrauch | 300/21 |
| 6,311,360 B1 | * | 11/2001 | Lanvers | 300/21 X |

FOREIGN PATENT DOCUMENTS

| | | | | |
|---|---|---|---|---|
| DE | 3832520 | * | 4/1990 | 300/21 |
| DE | 4302870 | * | 8/1994 | 300/21 |
| EP | 0 142 885 | | 5/1985 | |
| EP | 0 676 268 | | 10/1995 | |
| EP | 0 681 798 | | 11/1995 | |

* cited by examiner

Primary Examiner—Mark Spisich (57) ABSTRACT

The present invention relates to a method of producing brushes, especially toothbrushes, which comprise a brush body and at least one bristle bundle composed of a plurality of oriented bristle filaments, the method comprising the steps of introducing the bristle bundle into a channel which is formed on a moulding tool component, partially melting the bristle bundle at its fixing-side end so as to form an enlargement, closing the moulding tool and filling it with a flowable material. According to a first aspect of the present invention, the method is further developed in that at least a weakened length area of the bristle filaments, which is created when the bristle bundle is partially melted, is completely surrounded by the enlargement. According to a further aspect of the present invention, hot gas is used for forming the enlargement. The device for producing brushes, especially toothbrushes, which is suggested for executing the method in accordance with the present invention, comprises a moulding tool component which is a constituent part of a moulding tool and which is provided with at least one channel for holding a bristle bundle, and a mould filling device which communicates with the moulding tool component as well as a heating device which is associated with the moulding tool component and used for partially melting one end of the bristle bundle. In order to achieve short processing times, at least one hot-gas nozzle is provided which is directed towards the moulding tool component.

8 Claims, 5 Drawing Sheets

METHOD FOR PRODUCING BRUSHES

REFERENCE TO RELATED APPLICATION

This is a continuation application of PCT International Application No. PCT/EP99/03873 filed Jun. 2, 1999.

BACKGROUND OF THE INVENTION

1. Field of the Invention

The present invention relates to a method and a device for producing brushes.

2. Description of the Related Art

DE-pat. 845 933 discloses a method for producing brushes, especially tooth brushes, in a moulding tool. In the case of said known method bristle bundles composed of a plurality of bristle filaments are introduced into channels formed on a moulding tool component of an injection mould. The fixing-side ends of the bristle bundles are partially melted so as to form an enlargement. For this purpose, a hot plate is applied to the fixing-side ends of the bristle bundles, which partially melt thus forming an enlargement protruding beyond the diameter of the bristle bundle. Following this, the mould cavity is closed and thermoplastic material in a flowable state is injected into the moulding tool. According to this known method, the enlargement is embedded in spaced relationship with the outlet opening of the channel in the brush body produced from said thermoplastic material.

Further developments of the method of the type in question were focussed on the sealing of the channels during the mould filling process. DE-A 38 32 520, for example, suggests special sealing measures by means of which the bristle bundles were sealed from the channel wall in cases in which the enlargement was arranged in spaced relationship with the outlet opening of the channel. According to the disclosure of DE-C-35 11 528 the channels should preferably be sealed by positioning the enlargement in contact with said channels.

In addition to the sealing of the channels during the mould filling process, the embedding depth of the enlargement in the brush body, i.e. the distance between the enlargement and the surface of the brush body, is of essential importance. When the enlargement is located directly on the surface of the brush body, the bristle bundles will have a low resistance to being pulled out. Accordingly, DE-C-36 42 124 suggested a method of the type in question in the case of which the channels were extended by a sleeve projecting into the mould cavity so that, on the one hand, the channel was sealed by the enlargement abutting on the sleeve and so that, on the other hand, the enlargement was arranged in spaced relationship with the surface of the brush body.

It follows that the person skilled in the art knows a plurality of methods of the type in question in the case of which the enlargement is arranged at different distances from the surface of the brush body.

EP-B-0 759 711 suggests a method of the type in question in which the enlargement is spaced from the outlet opening of the channel in such a way that, when thermoplastic material is subsequently filled into the injection moulding tool, a thermally weakened length or linear area of the plastic monofilaments, which was created when the fixing-side ends were partially melted and which protrudes beyond the enlargement, is encompassed by the molten plastic material. According to the disclosure of this prior art, the weakened length area of the bristle bundles, which is arranged between the enlargement and the outlet opening, is fully encompassed by the solidified plastic material of the brush body so as to achieve the highest possible bending elasticity and good re-straightening properties of the bristle bundles. This method is, however, disadvantageous insofar as the enlargement must be arranged at a distance from the outlet opening of the channel or at a distance from a sleeve extending the length of said channel; for finding out said distance, the thermally weakened length area has to be determined by complicated measures.

It is the object of the present invention to improve the method according to the generic clause and, in particular, to provide a method by means of which brushes can be produced whose bristle bundles have a good bending elasticity and good re-straightening properties irrespectively of the embedding depth of the enlargement. According to a further aspect, it is the object of the present invention to provide a device which is suitable for executing said method.

In order to achieve the above object as far as the method is concerned, it is suggested that, according to a first aspect of the present invention, a weakened length area of the bristle filaments, which is created when the bristle bundle is partially melted, should be surrounded completely by the enlargement.

According to this first aspect of the present invention, the partial melting of the fixing-side ends of the bristle bundle or bristle bundles is carried out such that the melt formed during said partial melting will partially encompass the non-melted bristle filaments in the longitudinal direction thereof to such an extent that the weakened length area of all bristle filaments will be surrounded by the enlargement, said weakened length area being caused by thermal influences. Practical tests have shown that melt produced on the end face of the bristle bundle can be distributed over the circumference of the non-melted bristle bundle without causing, due to thermal influences, a reorientation of the molecular chains of the oriented filaments in the longitudinal direction of the bristle filaments behind the melt front.

It follows that, according to a first aspect of the present invention, bristle bundles are produced, which are provided with an enlargement on their fixing-side end and the thermally weakened length area of which does not extend beyond said enlargement. Hence, the bristle area of the brush produced has a good bending elasticity and good re-straightening properties independently of the embedding depth of the enlargement in the brush body.

According to another aspect, the present invention further develops the method insofar as hot gas is used for forming the enlargement.

In comparison with the hot knife which is known from the prior art and which is brought into contact with the fixing-side ends of the bristle bundles, the method can be executed particularly economically when the enlargement is formed by means of hot air. In accordance with the method according to the present invention, the bristle bundles are partially melted in a contact-free manner on the fastening side; this will lead to a preferred spherical shape of the enlargement and the clamping force required for holding the bristle filaments in the channels will be small. In addition, when a hot gas is used, the amount of heat applied to the fixing-side end can be controlled more easily than in cases in which a hot knife is used whose temperature is established due to comparatively slow heat conducting processes. The use of hot gas additionally provides the possibility of influencing the propagation direction of the melt through the orientation of the gas jet.

With respect to the optical qualities of the brush, especially in cases where a transparent material is used for the brush body, the gas used should preferably be an inert gas.

The propagation direction of the melt can be influenced in a particularly effective manner with small nozzles. Nozzles having a discharge cross-section which corresponds to 2 to 20 times, preferably 5 to 10 times, the cross-section of the bristle bundle acted upon can be regarded as small nozzles.

With respect to a complete embedding of the thermally weakened length area, the hot gas should preferably be blown against the end face of the bristle bundle. In the case of such a preferred method, the melt created on the end face of the bristle bundle is, by means of the air applied, first urged radially outwards, relative to the bristle bundle, and then pushed partially over the bristle bundle in the longitudinal direction.

In accordance with a preferred embodiment of the method according to the present invention, the fixing-side end of the bristle bundle is arranged in spaced relationship with the moulding tool component, but the enlargement is formed without there being any distance to the channel. In the case of this preferred embodiment, the flow front of the enlargement solidifies at the outlet opening of the channel. The bristle bundles are here held in the channel, i.e. the bristle filaments abut on the comparatively cold moulding tool component. The outer bristle filaments, which come into direct contact with the melt running down the bristle bundle, are cooled by the moulding tool component. This prevents the filaments projecting beyond the enlargement from being heated to a critical temperature at which a thermally caused weakening has to be reckoned with. It turned out that, especially in the case of oriented filaments consisting of polyamide, said critical temperature is substantially equal to the melting temperature.

In accordance with another preferred embodiment of the present invention, the melt forming the enlargement is brought into contact with the moulding tool component. Following this and prior to filling the moulding tool with the flowable mass, the bristle bundle provided with the enlargement is preferably axially displaced, i.e. it is arranged in spaced relationship with the surface of the moulding tool component and, consequently, in spaced relationship with the outlet opening of the channel, so as to achieve the best possible resistance to pulling out.

With respect to an economical execution of the method, the moulding tool component should preferably be moved past a blowing device giving off hot gas so as to form the enlargement, and the moulding tool component should sealingly be installed in the moulding tool so as to complete the same. When the method is executed in this way, the moulding tool component and, consequently, the formation of the enlargement is decoupled from the moulding tool, i.e. the mould filling cycle is independent of the preparation of the bristle bundles (insertion of the bristle filaments in the channels of the moulding tool component, formation of the enlargement, axial displacement, if desired).

In accordance with another preferred embodiment of the present invention, the moulding tool component is cooled while being moved either towards or away from the moulding tool. This kind of cooling is to be preferred especially in combination with the formation of the enlargement without there being any distance to the channel and/or the formation of the enlargement by bringing the melt into contact with the moulding tool component with regard to the best possible cooling of the bristle filaments arranged on the outer circumference of the bristle bundle.

In order to achieve the above object as far as the device is concerned, a device according to the generic clause, which is used for producing brushes, especially toothbrushes, and which comprises a multi-cavity moulding tool, a mould filling means communicating with the moulding tool and a heating means associated with the moulding tool holding the bristle bundles, is further developed in such a way that the heating device comprises at least one hot-gas nozzle which is directed towards the moulding tool component.

Such a device can be controlled precisely and with a short reaction time as far as the heat input at the fixing-side ends of the bristle bundles is concerned. The disadvantages of a heated-knife control determined by slow heat conducting processes are eliminated in this way.

Further details, features and advantages of the present invention can be seen from the following description of a plurality of embodiments, in which.

DETAILED DESCRIPTION

Figure 1:
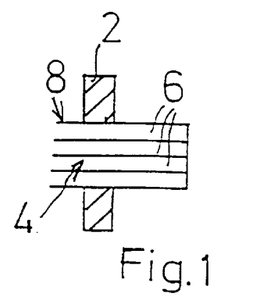
FIGS. 1 to 3 show the essential steps of one embodiment of a production method according to the present invention.
Figure 2:
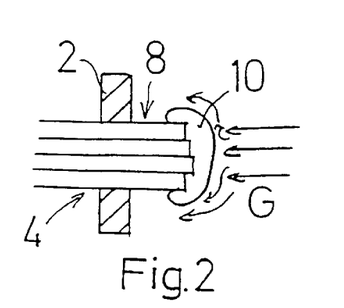
Figure 3:
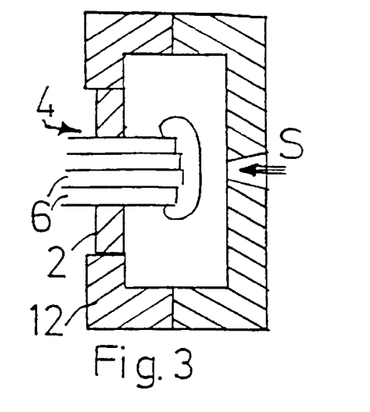

FIGS. 1 to 3 show exemplarily the essential steps of a method for producing brushes, the example shown here relating to toothbrushes. A moulding tool component, which is here implemented as a perforated field plate 2 whose channels 4 are arranged in a perforation pattern corresponding to the bristle area to be produced, is equipped with bristle filaments 6. In so doing, the bristle filaments 6 are introduced in the channel to such an extent that all the bristle filaments 6 of a bristle bundle 8 have their fixing-side ends arranged in spaced relationship with the perforated field plate 2.

As can be seen in FIG. 2, an enlargement 10 is formed by blowing a hot inert gas G onto the end face of the bristle bundle 8 defined by the bristle filaments 6. FIG. 2 shows the not yet fully implemented enlargement 10 as indicated schematically, the hot inert gas G impinges on the end face of the bristle bundle where it partially melts the material of the bristle filaments 6. The resultant melt is driven by the flow of gas G racially outwards relative to the bristle bundle S and then along the bristle filaments 6. A melt front forms, which moves on the outer circumferential surface of the bristle bundle B in the direction of the perforated field plate 2. In the embodiment shown, the formation of the melt front is stopped, when the melt front comes into contact with the cold perforated field plate 2 and solidifies there immediately. In a method step which is not shown, the bristle filaments 6 provided with an enlargement 10 are ten axially displaced so that the enlargement 10 will be arranged in spaced relationship with the outlet opening of the channel 4. This distance can be chosen as desired.

Following this, the perforated field plate 2 is installed in a moulding tool 12, which is shown in FIG. 3, so as to complete said moulding tool. Melt S is injected into the mould cavity of the tool 2, 12 by a mould filling means which communicates with the moulding tool and which is here defined by an injection moulding machine. The thermoplastic material solidifies thus forming a brush body in which the enlargement 10 is arranged in spaced relationship with the brush body surface through which the bristle bundles 8 extend.

Figure 4:
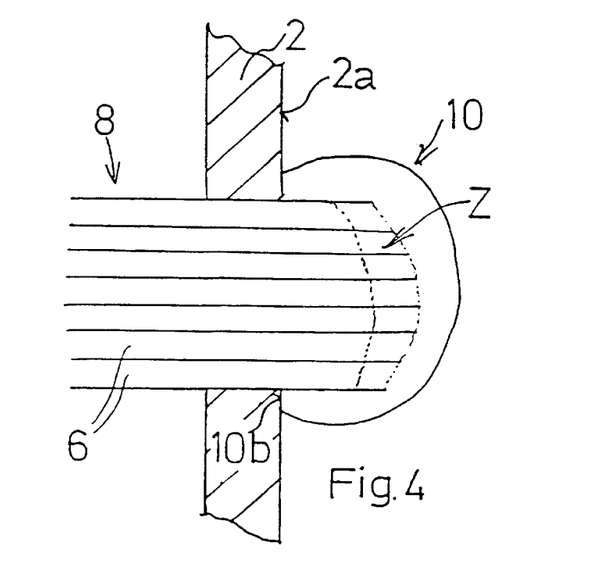
FIG. 4 shows a schematic sectional view of a fully developed enlargement.

FIG. 4 shows a schematic sectional view of an enlargement produced according to the present method after the completion of the method step shown in FIG. 2. As can be seen in said figure, the melt front of the enlargement 10 has come into contact with the perforated field plate 2. Hence, the enlargement includes an annular area 10b which extends parallel to the surface 2a of the perforated field plate 2 delimiting the channel 4 and through which the bristle filaments 6 project. The enlargement 10 encompasses the bristle filaments 6 such that the fixing-side ends of the bristle filaments 6 are still arranged in spaced relationship with the opening of the channel 4. At the fixing-side ends of the bristle filaments 6 a sickle-shaped zone Z is shown in the drawing. This zone Z comprises the length area of the bristle filaments 6 that is weakened due to the thermal load to which the bristle filaments are subjected when the enlargement 10 is produced by partial melting. In this area the molecular chains are no longer oriented in the longitudinal direction of the filaments.

Figure 5:
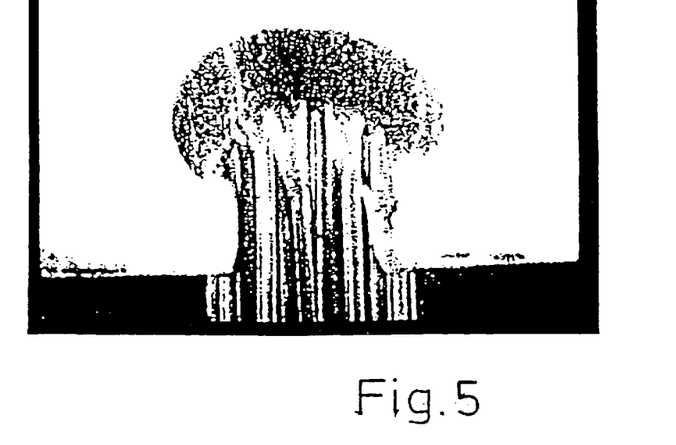
FIG. 5 shows a photographic sectional view through an enlargement produced in accordance with the method according to the present invention.

FIG. 5 shows a photographic sectional view of an enlargement produced in accordance with the method according to the present invention. In this sectional view the zone Z, which comprises the thermally weakened length area of the bristle filaments, can be seen clearly. As has already been explained hereinbefore making reference to FIG. 4, the zone Z is sickle-shaped, i.e. the bristle filaments having the longest thermally weakened length area are arranged in the middle of the bristle bundle, whereas the bristle filaments having the shortest thermally weakened length area are arranged on the circumferential surface of the bristle bundle. The zone Z has a convex shape, i.e. it differs from the concave zone which comprises the thermally weakened length area of the bristle filaments of a bundle and which is created when the enlargement is formed in a conventional way by means of a hot plate. The hot plate is either moved into contact with the fixing-side ends of the filaments or it is held in spaced relationship with said ends. Due to the contact heat or the radiant heat, the fixing-side end is partially melted. The filaments arranged on the circumferential surface of the bristle bundle are cooled by the ambient air more strongly than the filaments located in the core of the bundle. The temperature established in the middle of the bristle bundle is therefore higher than that on the circumferential surface of the bundle, and this leads to the formation of a concave zone Z.

Figure 6:
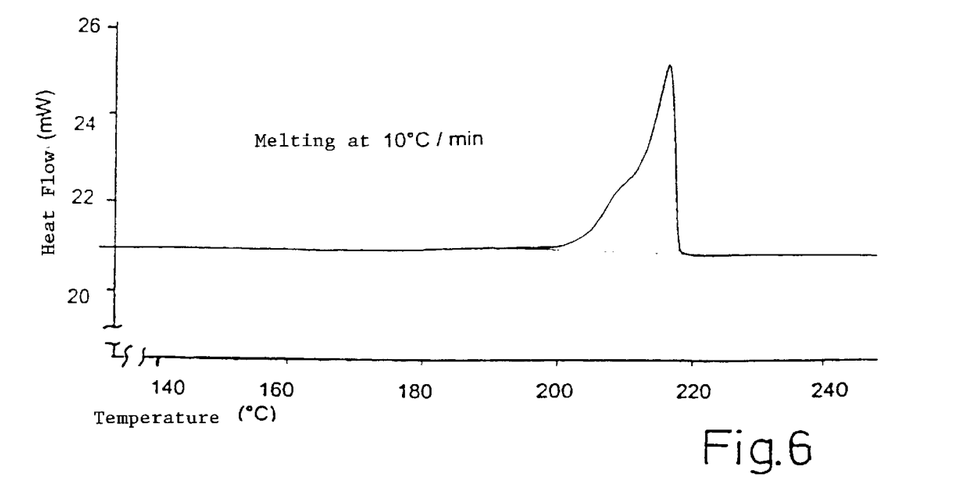
FIG. 6 shows a DSC diagram for polyamide bristle filaments.

As can be proved on the basis of DSC (differential scanning calorimeter) measurements according to ISO 3146, a typical test result of which is shown in FIG. 6, the bristle filaments arranged on the outer circumferential surface of the bristle bundle are not weakened by a thermally induced reorientation of the molecules in the area of the solidifying melt front of the enlargement. A thermal reorientation at a temperature below the melting temperature would find expression in a DSC diagram as an exothermic deviation due to the fact that the molecular chains rub against one another when they change their position. Precisely below the melting temperature it is, however, not possible to see any exothermic deviation in the case of a DSC diagram according to FIG. 6. In actual fact, the diagram only shows an endothermic deviation. This deviation marks the melting of the filaments at approx. 200°. The melt front moving over the outer circumferential surface of the bristle bundle with a temperature corresponding approximately to the melting temperature is, a short time before its solidification, not able to partially melt the filaments arranged on the circumferential surface. Hence, bristle filaments which have not been partially melted and the molecular chains of which do not show any thermal reorientation exist below the melt front, i.e. radially within the enlargement, as will be explained in more detail hereinbelow making reference to FIG. 7.

The formation of the enlargement against the tool component, here the perforated field plate, in such a way that the melt front will solidify directly in front of the perforated field plate or will touch said perforated field plate only lightly should be preferred insofar as the cooled perforated field plate cools especially the filaments arranged on the circumferential surface of the bristle bundle. These outer bristle filaments are in direct contact with the perforated field plate. It follows that, by means of the cold perforated field plate, a defined solidification of the advancing melt front can be achieved on the one hand. Due to the radiant cold emitted by the perforated field plate, the flowing front is caused to freeze. On the other hand, a comparatively cold perforated field plate prevents melting of the bristle bundles in the radial direction directly below the solidifying melt front. This described combinatorial effect can only be achieved if the enlargement is formed against the perforated field plate and if the advancing melt front solidifies substantially without there being any distance to the moulding tool component, here the perforated field plate.

Figure 7:
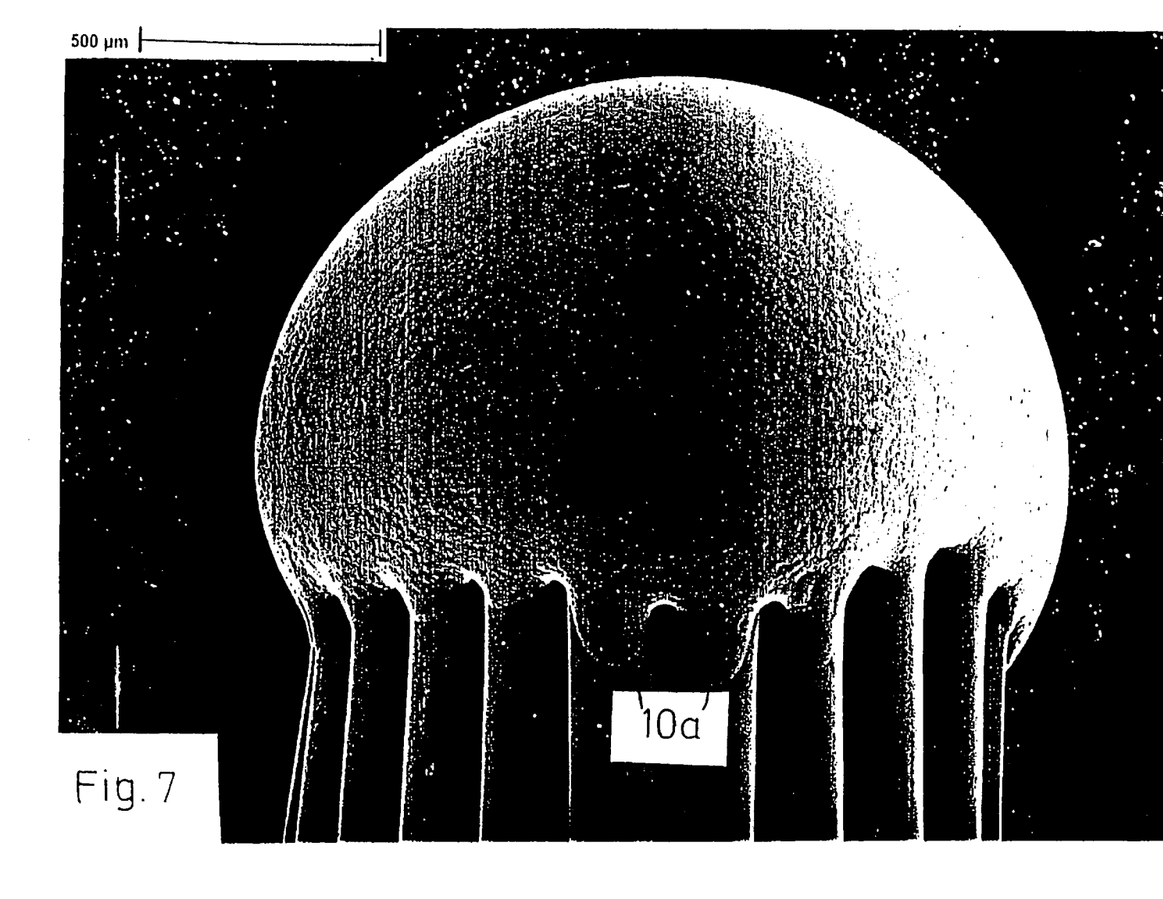
FIG. 7 shows a scanning-electron-microscopic view of an enlargement and FIGS. 8 and 9 show an embodiment of a heating means.

FIG. 7 shows a scanning-electron-microscopic view of an isolated bristle bundle with an enlargement which has been formed by applying hot gas. In contrast to the methods shown in FIGS. 1 to 4, the melt of the enlargement forming has not been in direct contact with the moulding tool component. On the contrary, though formed without there being any distance to the channel, the enlargement has been formed without coming into direct contact with the moulding tool component. When the method is executed in this way, the parameters of hot-gas application are adjusted such that, due to the radiant cold emitted by the moulding tool component, the melt front advancing towards the moulding tool component will solidify substantially without there being any distance to the moulding tool component. A distance of up to 300 $\mu$m is still considered to fall under the formulation without there being substantially any distance to the moulding tool component.

As can clearly be seen in FIG. 7, a characteristic feature of the enlargement formed by means of hot-gas application is a spherical surface. Since the enlargement is produced in a contact-free manner, i.e. since no hot object is applied to the enlargement for the purpose of forming the same, the surface of the enlargement is free from faults, i.e. it is free from steps, edges or the like. The spherical, faultless surface of the enlargement causes a preferred embedding of the enlargement in the brush body, since the flowable mass, which solidifies under pressure in an injection moulding process, is applied to the enlargement in a hydrostatic pressure state. The cohesion of the bristle filaments combined in the bristle bundle will be improved in this way and the bristle filaments of a bristle bundle will not be spread like a bunch of flowers, such spreading being known from the prior art e.g. when an enlargement is arranged without any distance from the surface of the brush body.

FIG. 7 shows also clearly that the enlargement has lips 10a towards the use-side ends of the bristle filaments, said lips extending partly over the outer circumferential surface of the bristle filaments which are arranged on the outer circumferential surface of the bristle bundle. These lips 10a, which belong to the enlargement, cover in some cases a certain sub-length of the thermally weakened area. The lips, however, cover the outer circumferential surface of the respective filaments with a temperature lying very close to the melting temperature of the bristle filaments. As has been explained hereinbefore making reference to FIG. 6, it was possible to prove that the heat influence exerted by the lips does not cause any thermal damage to the bristle filaments. Hence, a thermally weakened length area immediately after the lips does not appear in the case of the outer bristle filaments (cf. FIG. 5).

Figure 8:
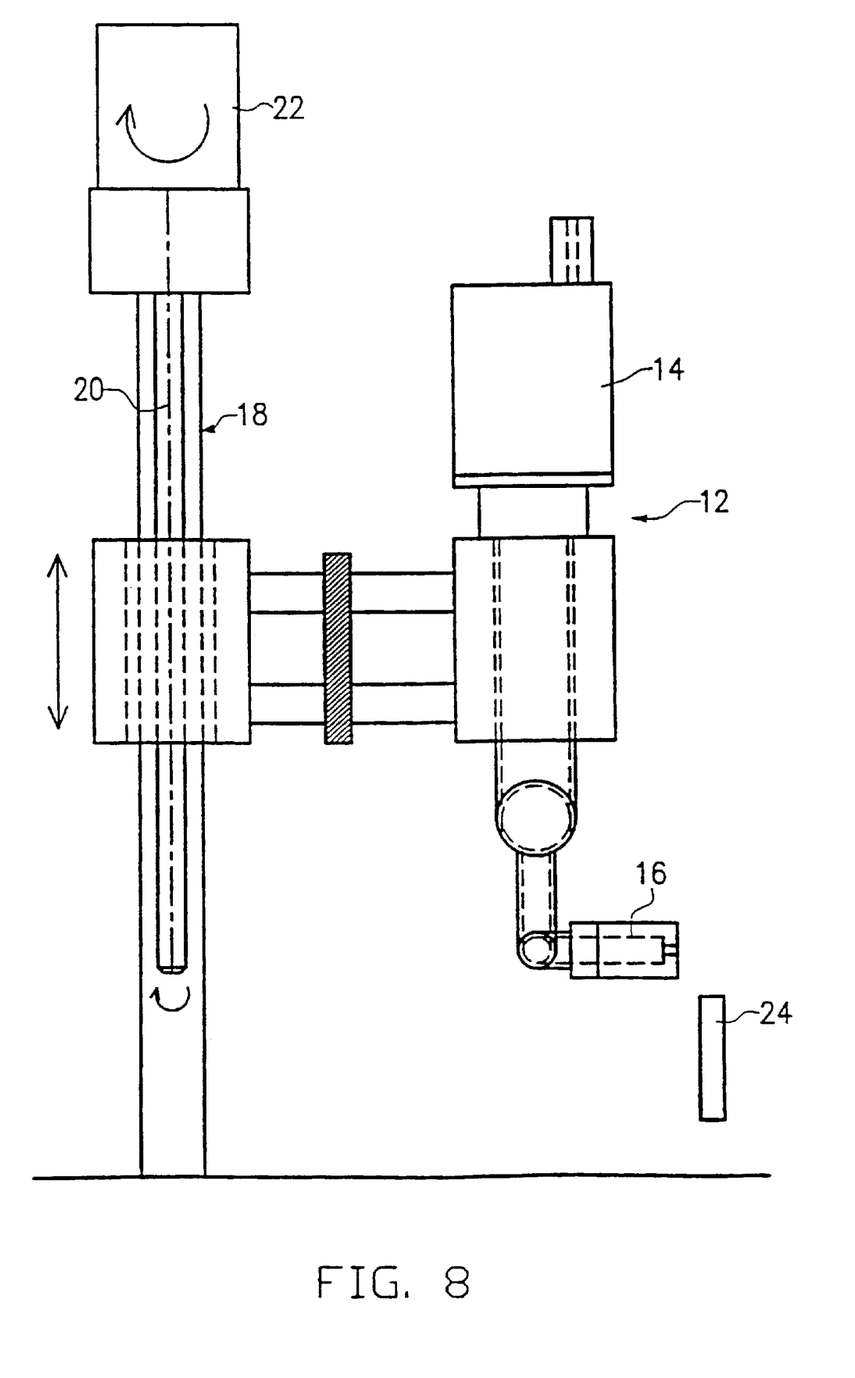
Figure 9:
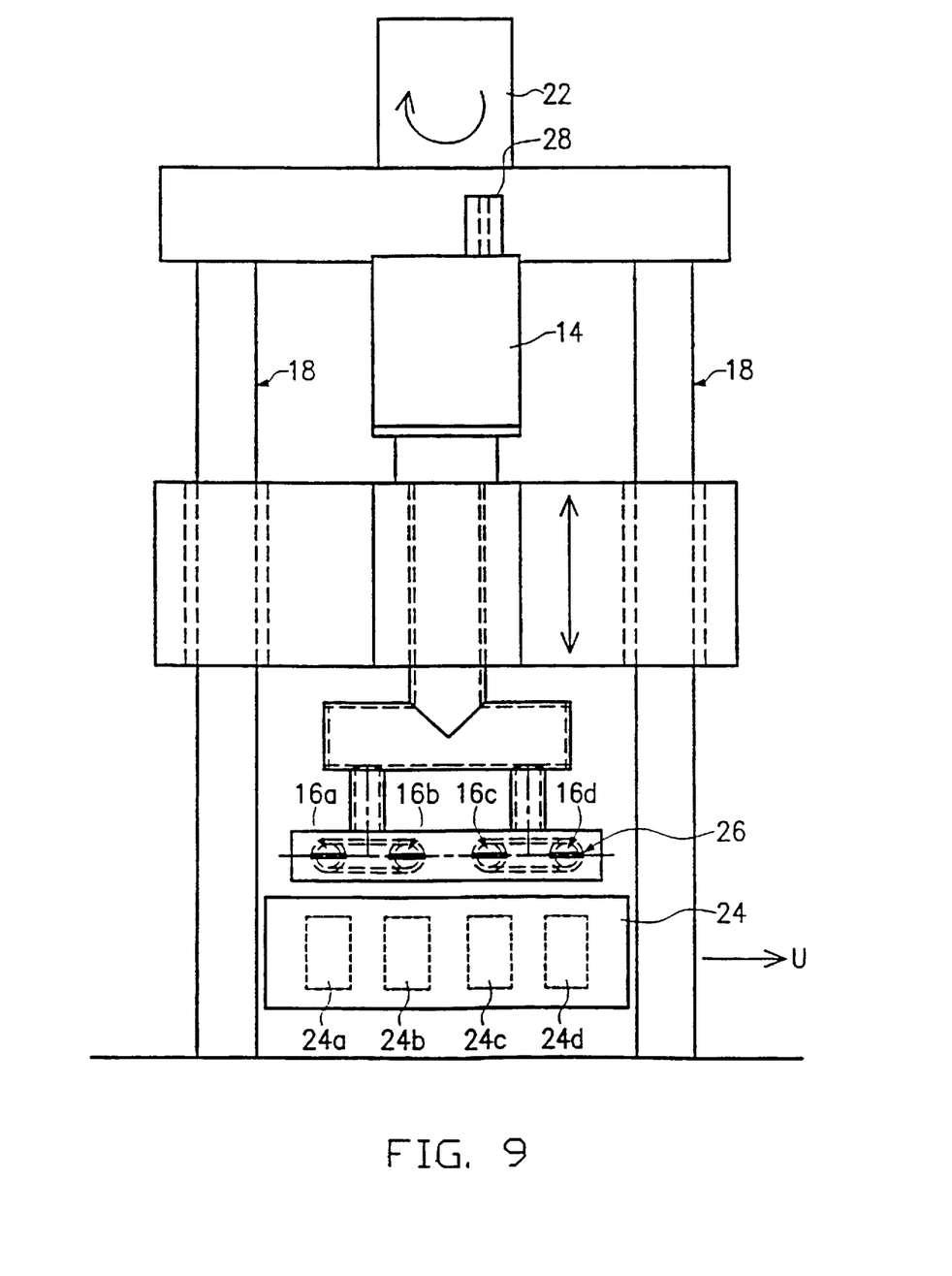

FIGS. 8 and 9 show the essential components of an embodiment of a heating means of the device according to the present invention in a side view (FIG. 8) and in a top view (FIG. 9).

The heating means consists essentially of a structural unit 12 comprising a fan heater 14 as well as a plurality of juxtaposed hot-gas nozzles 16 which communicate with said fan heater 14. The structural unit 12 is displaceable along vertically extending guide means 18 and adjustable in the vertical direction through a spindle 20 driven via a drive motor 22.

In the embodiment shown, the heating means is a constituent part of a preparation path provided with a holder (not shown) for tool components, which circulates on a circular path, only one moulding tool component of said tool components being shown in FIGS. 6 and 7; in the present case, said one moulding tool component is defined by a perforated field plate 24. For completing a multi-cavity moulding tool, the perforated field plate 24 of the embodiment shown is implemented such that it comprises four identical mould cavities communicating with a single mould filling means. The moulding tool can also be implemented as a tool for multi-component injection moulding and comprise a plurality of groups of mould cavities which deviate from one another, the parts produced in the mould cavities of the first group being, together with the respective perforated field plate 24, inserted into the mould cavities of the second group whose volume is larger than that of the mould cavities of the first group, said insertion being preferably effected by means of rotation. In the mould cavities of the second group, the parts are then encompassed by injection moulding with a second component, especially a soft-elastic plastic component, so as to form gripping areas or elastic functional elements on the brush. Also in the second group of mould cavities, the perforated field plate 24 has a sealing effect on the multi-cavity injection moulding tool.

As can be seen in FIG. 9, the perforated field plate 24 has four juxtaposed fields of perforations 24a–d. Each field of perforations 24a–d has associated therewith a hot-gas nozzle 16a–d whose nozzle slots 26 cover the whole width of a field of perforations 24a,b,c,d, said nozzle slots 26 extending in the direction of circulation U of the perforated field plate 24.

For forming an enlargement, cold air is introduced in the fan heater 14, in the present case through an inlet opening 28, and supplied via flow passages to the nozzle slots 26 of the hot-gas nozzles 16. In order to reduce the amount of energy required, the device can be so conceived that, by means of suitable control, the air will only be heated when a perforated field plate 24 equipped with bristle filaments has arrived at the heating means according to FIGS. 8 and 9 and when the fields of perforations 24a–d are arranged below the respective nozzles 16a–d. The vertically displaceable structural unit will then be lowered starting from the position shown in FIG. 9. The hot gas from the nozzle slots 26 sweeps over the respective fields of perforations 24a–d. In the case of bristle bundles having a diameter that changes in the direction of lowering, the lowering speed of the structural unit 12 will be adapted such that the speed at which the nozzles 16 are moved past larger-diameter bristle bundles is lower than the speed at which they are moved past smaller-diameter bristle bundles. It follows that, in the case of a perforated field plate having channels of different diameters, the hot-gas nozzle will not be lowered at a continuous speed transversely to the direction of circulation U, but the lowering speed will in each case be adapted to the respective channel diameter.

When the hot gas of the hot-gas nozzles 16a–d has fully swept over the fields of perforations 24a–d, enlargements have been formed on all the bristle bundles, as has been explained in more detail hereinbefore with reference to FIGS. 1 to 4. When the fan heater 14 has been switched off, the nozzles 16 can be returned to their starting position shown in FIG. 9 and an additional perforated field plate 24 equipped with bristle filaments can be supplied to the heating means by displacing the holders in the direction of circulation U. The perforated field plate 24 with the bristle bundles provided with the enlargement is removed from the holder of the preparation path at a later station and inserted into a multi-cavity moulding tool (not shown) so as to complete the same.

For reducing the cycle time between two successive processes in which the bristle filaments are partially melted, it may be of advantage to choose the end position of the preceding processing step as a starting position for partially melting the bristle filaments contained in the next perforated field plate 24. When the method is executed in this way, movements of the structural unit 12 will exclusively take place within the framework of a melting process at a perforated field plate 24.

What is claimed is:

1. A method for producing a brush including a body, and at least one bristle bundle carried by said body, said bristle bundle having a plurality of oriented bristle filaments, comprising:
   (a) introducing one end of the bristle bundle into the cavity of a mold (12) via a channel opening (4) contained in one wall (2) of said mold, thereby to cause said one bristle bundle end to project from said wall into said cavity;
   (b) blowing a hot gas stream longitudinally against the end face of said bristle bundle one end portion to melt said end face and drive back the melt so produced over the circumference of the non-melted bundle one end, and into contact with said mold one wail thereby to form an enlargement such that the bristle filaments on the outer circumference of the bristle bundle adjacent the solidifying melt front are cooled by the mold in order to form said enlargement encompassing a non-melted length of the bristle bundle without any partial melting or thermal reorientation of the molecular chains of the bristle filaments of said non-melted bundle;
   (c) axially displacing the bristle bundle so that the enlargement is arranged in spaced relation with said mold one wall and said mold channel opening; and
   (d) subsequent to said axial displacement of said bristle bundle, filling the mold cavity with a flowable material, thereby to define at least one portion of the brush body containing said enlargement.

2. A method for producing a brush as defined in claim 1, wherein bristle filaments are formed from a polyamide synthetic plastic material, and wherein said hot gas is an inert gas.

3. A method for producing a brush as defined in claim 2, wherein the effective diameter of the hot gas stream is from two to twenty times the diameter of the bristle bundle.

4. A method for producing a brush as defined in claim 3, wherein the effective diameter of the hot gas stream is from five to ten times the diameter of the bristle bundle.

5. A method for producing a brush as defined in claim 1, wherein a plurality of said bristle bundles are provided that extend at one end into said mold cavity, a plurality of hot gas streams being directed against the end surfaces of said bristle bundles, respectively.

6. A method for producing a brush as defined in claim 5, wherein the period of time for which the hot gas stream is directed against each bristle end surface is a direct function of the diameter of the associated bristle bundle.

7. A method for producing a brush as defined in claim 1, and further including:

(e) displacing the hot gas stream laterally relative to said bristle bundle end, said bundle end being supported by said one wall containing said mold channel opening.

8. A method for producing a brush as defined in claim 7, and further including the step of:

(f) cooling said mold one wall.

* * * * *